United States Patent [19]

Wüster

[11] Patent Number: 5,433,524
[45] Date of Patent: Jul. 18, 1995

[54] COMPOST CONTAINER COMPRISING A STIRRING MECHANISM

[76] Inventor: Heinrich Wüster, Auwerk 18, A-6460 Imst, Austria

[21] Appl. No.: 211,106
[22] PCT Filed: Jul. 21, 1993
[86] PCT No.: PCT/AT93/00121
  § 371 Date: Mar. 15, 1994
  § 102(e) Date: Mar. 15, 1994
[87] PCT Pub. No.: WO94/02433
  PCT Pub. Date: Feb. 3, 1994

[30] Foreign Application Priority Data

Jul. 22, 1992 [AT] Austria .................. 1502/92
Mar. 25, 1993 [AT] Austria .................... 603/93

[51] Int. Cl.⁶ .................. B01F 7/08; B01F 7/14
[52] U.S. Cl. .................. 366/244; 366/261; 366/288; 422/184
[58] Field of Search .............. 366/244, 261, 272, 241, 366/242, 287, 288; 422/184, 209; 71/8, 9

[56] References Cited

U.S. PATENT DOCUMENTS

| | | | |
|---|---|---|---|
| 1,612,281 | 12/1926 | Goetz | 366/244 |
| 2,345,163 | 3/1944 | Vollrath. | |
| 2,867,419 | 1/1959 | Heinzerling | 366/244 |
| 3,861,656 | 1/1975 | Schmitt | 366/244 |
| 3,890,129 | 6/1975 | Chester | 366/234 |
| 4,079,917 | 3/1978 | Popeil | 366/244 |
| 4,453,831 | 6/1984 | Mahon | 366/244 |
| 5,123,600 | 6/1992 | Takenaka. | |

FOREIGN PATENT DOCUMENTS 2138795 10/1984 United Kingdom.

Primary Examiner—Robert W. Jenkins
Attorney, Agent, or Firm—Collard & Roe

[57] ABSTRACT

A compost container (1) comprises a stirring mechanism (7), which is adapted to be driven from the outside by means of an external shaft (6) and comprises at least one stirring element, which is disposed in the container (1) and rotatable about its own axis. It is proposed that the container (1) comprises a chamber (5), which serves to receive the material to be composted and contains at least one stirring element (8), which is movable inside the container (1) along a closed path and is rotatable about its own axis and is connected to a driving mechanism (9), which controls the movements of the stirring element and is adapted to be driven by means of the external shaft (6). The chamber for receiving the material to be composted may be defined at its bottom by a sieve plate.

34 Claims, 1 Drawing Sheet

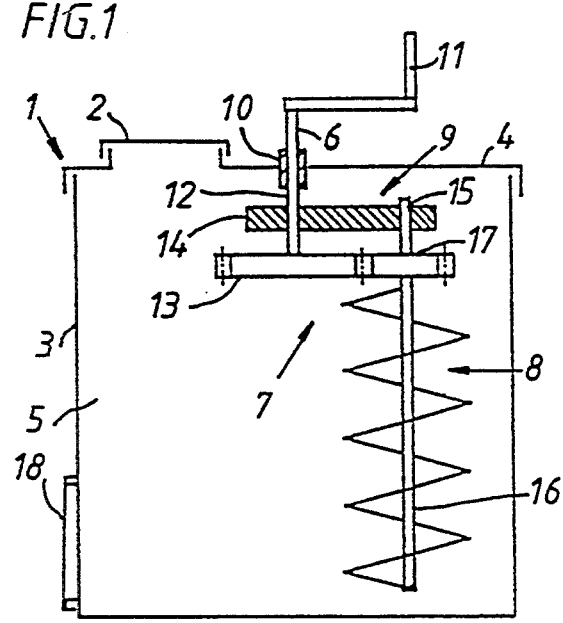
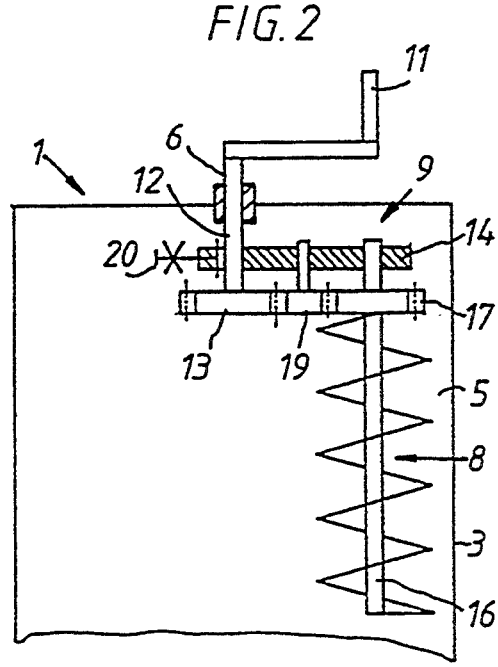
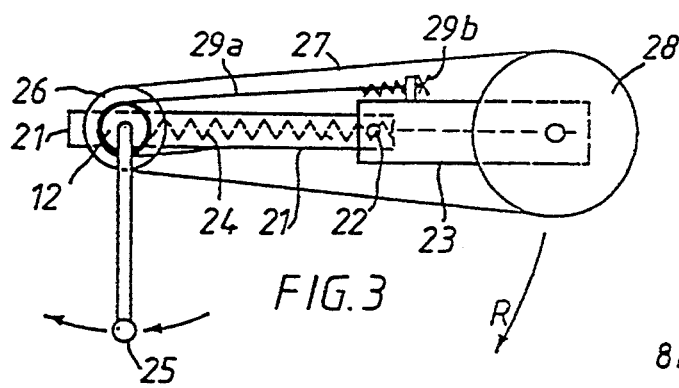
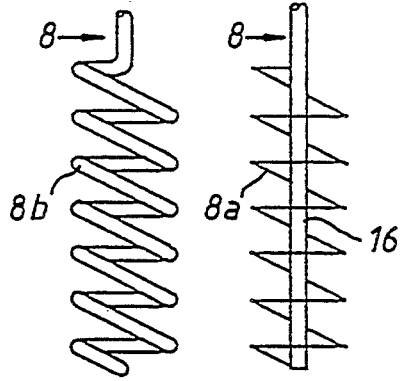
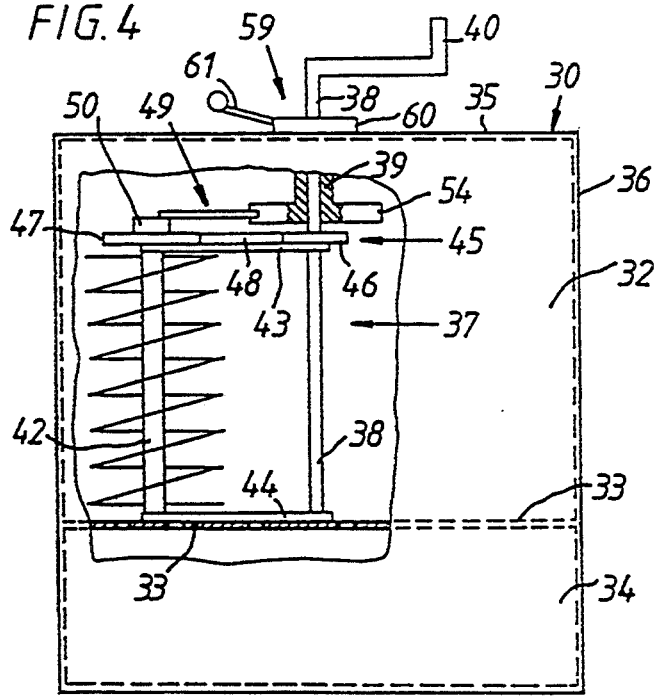
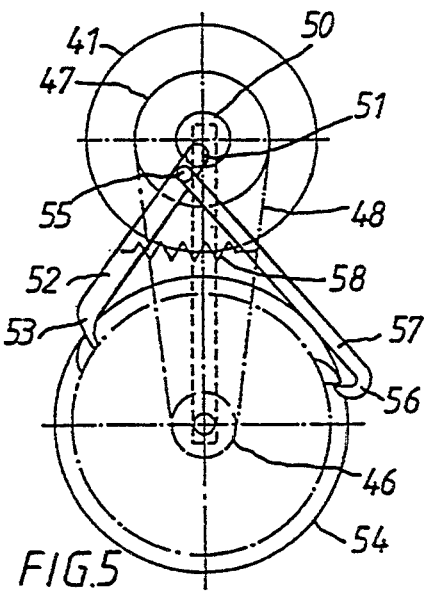

6,433,524

COMPOST CONTAINER COMPRISING A STIRRING MECHANISM

FIELD OF THE INVENTION

This invention relates to a compost container comprising a stirring mechanism, which is adapted to be driven from the outside by means of an external shaft and comprises at least one stirring element, which is disposed in the container and rotatable about its own axis.

PRIOR ART

In a known compost container of that kind (GB 2,138,795 A) the stirring element is disposed in the lower half of the container along the center line of the container in the continuation of the external shaft, which is provided with a crank handle and extends inwardly through the top wall of the container, and the stirring element comprises a helical stirring blade close to the side wall of the container. That stirring element is designed to mix the entire contents of the lower half of the container during a single revolution of the stirring element and the crank handle. For that reason the forces required to rotate the crank handle can be exerted only if the amount of waste material is small or the waste material consists of loose plant waste. That embodiment is not suitable for compost containers having a relatively high capacity and comprising a correspondingly larger stirring element or for a composting of compact, moist, lump-forming material, such as kitchen refuse. For this reason that compost container can provide only in a highly restricted degree for an adequate aeration of the material being composted.

An actual composting cannot be effected unless sufficient air, i.e., sufficient oxygen, is supplied to the waste material. This is not problematic in the case of loose waste, such as leaves or chopped twig residues, but cannot be effected in practice in the case of cut grass or even moist, lump-forming kitchen refuse and in addition to a stringly smelling putrefaction may sometimes result in toxic decomposition products. Because the waste dumps must be relieved, it is necessary to compost even moist kitchen refuse in larger quantities.

To improve the necessary supply of air or oxygen to the waste material in the compost container, which supply is required for a fast composting with a minimum of smell, it is also known to provide ventilation holes in the side walls of the compost container or to provide said walls with louver slats, which define ventilation slots, or to provide a perforated aerating tube at the center of the compost container. But in that case the supply of air will be improved only in the material being composted only in the marginal regions which adjoin the side walls or the central aerating tube whereas there will be a deficiency of oxygen and, as a result, a putrefying atmosphere, in the inner regions, which are at a substantial distance from said marginal regions. The inner regions of the material being composted, which inner regions are spaced a large distance from the aerated marginal regions, will increase in size as the size of the compost containers increase in size so that the air supply problems will be aggravated.

An inadequate supply of air can substantially be prevented in most cases in that the contents of the compost container are mixed by hand in short intervals of time so that the parts of the material being composted which are exposed to the oxygen being supplied are continually changed. But that work is inconvenient owing to the smell and dust nuisance which may be expected.

SUMMARY OF THE INVENTION

It is an object of the invention to provide a compost container which permits a simple and effective mechanical mixing of the material being composted.

In a compost container of the kind described first hereinbefore this is accomplished in accordance with the invention in that the container comprises a chamber for receiving the material to be composted and said chamber contains at least one stirring element, which is movable inside the container along a closed path, and is rotatable about its own axis and is connected to a driving mechanism, which is adapted to be driven by means of the external shaft and controls the motions of the stirring element.

Owing to the design in accordance with the invention only a restricted part of the material being composted which is disposed within the chamber is tumbled by one or more rotating stirring elements and only during the revolution of the stirring elements along their orbit is the entire material being composted gradually handled in the chamber. By that processing, more highly composted parts of the material being composted are mixed with less composted or freshly supplied parts and the heavier parts, which have been virtually completely composted and have already a soillike structure, are conveyed downwardly in the chamber and can be taken from the chamber at its lower en. The progressive movement of the strirring element along the closed orbit may be gradual or intermittent. For that purpose the driving mechanism may consist of two parts. One part controls the revolving motion of the stirring elements and the other part controls the rotation of the stirring elements.

In accordance with the invention the driving mechanism may be mounted inside the container, preferably on the underside of a cover, which closes the chamber at its top and preferably can be removed.

According to a further feature of the invention the stirring element which is rotatable about its own axis may be eccentrically disposed with respect to a drive shaft of the driving mechanism, which drive shaft is adapted to be driven by means of the external shaft.

According to a further feature of the invention the stirring element may be mounted at the end of a carrying arm, which is rotatable about the axis of the drive shaft.

To intensify the revolving motion of the carrying arm in the material being composted, it is possible to provide in accordance with the invention that the carrying arm is adapted to be non-positively connected to the drive shaft or the shaft of the stirring element. The non-positive connection may be provided by a speed-reducing transmission or a friction clutch.

In accordance with the invention it is also possible to provide a friction brake for transmitting torque from the drive shaft and/or from the shaft of the stirring element to the carrying arm.

To permit an adjustment of the revolving motion of the carrying arm in adaptation to different materials being composted, it is possible in accordance with the invention to provide means for adjusting the friction brake.

For an automatic adaptation of the revolving motion of the carrying arm to different states of distribution of the material being composted in the compost container, it is possible in accordance with the invention to mount on the carrying arm a feeler, which is engageable with the material being composted and connected to the means for adjusting the friction brake.

According to a further feature of the invention stirring element carrier is provided on the carrying arm and is movable against spring force relative to the carrying arm and the shaft of the stirring element is rotatably mounted in said stirring element carrier. The resilient support of the stirring element carrier relative to the carrying arm permits brief deceleration of the velocity of the revolving motion of the carrying arm when the stirring element engages more tightly packed material being composted.

According to a further feature of the invention the stirring element carrier is connected to the means for adjusting the friction brake. With that design a part of the torque which is transmitted to the carrying arm for its revolving motion can be used to drive the shaft of the stirring element.

According to a further Feature of the invention the stirring element carrier is connected to the carrying arm by a hinge, which is spring-biased to an extended position. With that design the velocity of the revolving motion can be decreased in heavy material being composted and an automatic crease of the velocity of the revolving movement in loose material being composted can subsequently be effected.

For an automatic adaptation of the velocity of the revolving motion to the resistance presented by the material being composted against the motion and For an increase the torque by which the stirring element is rotated when the torque by which the carrying arm is revolved is decreased, it is possible in accordance with the invention to provide for the transmission of torque to the carrying arm a band brake, which is adjustable by the relative movement of the carrying arm and the stirring element carrier, and in that case the spring opposing that relative movement may constitute a biasing spring for the band brake.

According to a further feature of the invention the driving mechanism operatively connecting the drive shaft and the stirring shaft of the stirring element may comprise two meshing drive gears, which are non-rotatably mounted on the drive shaft and the shaft of the stirring element, respectively.

According to a further feature of the invention an idler wheel, which is rotatably mounted on the carrying arm, may be interposed between the two drive gears.

According to a further feature of the invention the driving mechanism may comprise a drive, which is revolvable in unison with the carrying arm and connects the drive shaft to the stirring element. That drive may be a chain drive or belt drive or universal joint drive, which is coupled to the drive shaft. In accordance with the invention the drive which connects the drive shaft to the stirring element preferably consists of an optionally encapsulated chain drive.

According to a further feature of the invention the driving mechanism may comprise a ratchet mechanism for revolving the carrying arm.

According to a further feature of the invention the ratchet mechanism may comprise a ratchet wheel, which is adapted to be secured to the container or the container cover, and at least one drive pawl, which is engageable with said ratchet wheel and is movable by means of an eccentric, which rotates in unison with the stirring element.

According to a further feature of the invention the ratchet mechanism comprises a pusher pawl, which is pivoted to an eccentric, which rotates in unison with the stirring element, a pulling pawl, which is pivoted to the pusher pawl, and a spring, which engages both pawls and urges the pawls against the ratchet wheel.

According to a further feature of the invention the ratchet wheel may be mounted on a sleeve, which extends through the top wall of the container or of the container cover and is rotatably mounted in said top wall and is adapted to be fixed to said top wall by clamping means, which are accessible from the upper side of the top wall.

According to a further feature of the invention the stirring elements may consist of screws or of coreless helices.

According to a further feature of the invention the chamber which serves to receive the material being composted and contains the stirring element, which is movable along a closed path and is rotatable about its own axis, may be defined at its bottom by a sieve plate. With that design the heavier parts, which have been virtually completely composted and have already a soillike structure and are conveyed downwardly in the chamber to the sieve plate, can be removed from the chamber through the sieve plate. For this reason that design of the compost container in accordance with the invention permits a continuous composting with a continuous separation of the finished compost from the material which has not yet been completely composted. The degree to which the compost passing through the sieve plate has been composted can be determined by the selection of the size of the holes in the sieve plate.

According to a further feature of the invention the sieve plate may be replaceably mounted in the container.

According to a further feature of the invention the sieve plate may comprise two superimposed sieves.

According to a further feature of the invention, means for cleaning the sieve plate may be mounted on the carrying arm and may be caused to revolve in unison with the carrying arm.

BRIEF DESCRIPTION OF THE DRAWINGS

Some illustrative embodiments of the invention will now be explained more in detail with reference to the drawings. In the drawings FIG. 1 is a schematic sectional view showing a first embodiment of a compost container, FIG. 2 is a schematic sectional view showing a second embodiment of a compost container, FIG. 3 is a schematic representation of a driving mechanism, which is disposed inside the container of a third embodiment of the compost container, FIG. 4 is a schematic representation of a fourth embodiment of a compost container, which comprises a stirring mechanism, which can be driven from the outside by means of a crank handle. FIG. 5 is a schematic representation of the driving mechanism for the stirring mechanism of the compost container of FIG. 4, and FIGS. 6 and 7 show two stirring elements.

DESCRIPTION OF ILLUSTRATIVE EMBODIMENTS

FIG. 1 is a vertical sectional view showing a first embodiment of a compost container 1 in accordance with the invention. That container 1 comprises a cover 4, which is formed with a filling opening 2 and can be removed from the container 3, and an interior chamber 5, which serves to receive the material to be composted and contains a stirring mechanism 7, which is adapted to be driven from the outside by means of an external shaft 6 and comprises at least one stirring element 8, which is movable in the chamber along a closed path and is rotatable about its own axis and is connected to a driving mechanism 9, which controls the movements of the stirring element and is adapted to be driven by means of the external shaft 6.

A given stirring element 8 may consist of a screw 8a, which consists of a core tube and screw threads attached thereto (FIG. 6), or of a coreless helix 8b, which consists of helically coiled round material (FIG. 7). The helices can be manufactured at lower cost and require a small effort for an effective mixing.

The driving mechanism 9 for the stirring element 8, which is constrained to move in a circular orbit, comprises a bearing means 10 for the external shaft 6, which is provided with a crank handle 11. The bearing means 10 are mounted on the cover 4 of the container 3. The shaft 6 serves also as a drive shaft 12 for the driving mechanism 9 and at its lower end carries a gear 13. A rotatable carrying arm 14 is also mounted on the drive shaft 12 and at its end carries bearing means 15 for the stirring element 8. A gear 17 is connected to the upper end of the shaft 15 of the stirring element and meshes with the gear 13 on the drive shaft 12.

Upon a rotation of the crank handle 11, the stirring element 8 is driven by means of the two gears 13, 17 so that a constant torque is exerted, by which the stirring element 8 carried by the carrying arm 14 is moved about the gear 13 on the drive shaft 12 and the stirring element 8 describes a circular orbit in the container 3 and thus effects a desired intense mixing of the material being composted and, at the same time, a conveyance of the previously composted fine material into the lower portion of the container 3. The finished compost is taken from the lower portion of the container 3 through a take-out opening 18.

A further illustrative embodiment of a compost container 1 is shown in FIG. 2. To increase of the torque by which the stirring element 8 is caused to revolve, the driving mechanism 9 comprises an idler wheel 19, which is disposed between the gear 13 that is non-rotatably mounted on the drive shaft 12 and the gear 17 which is non-rotatably mounted on the shaft 16 of the stirring element. The idler wheel 19 is rotatably mounted in the carrying arm 14. For an infinite control of that revolution-imparting torque, adjustable clamping means 20 are provided between the drive shaft 12 and the carrying arm 14, which revolves about the drive shaft 12 and carries the idler wheel 19 and the stirring element 8 as well as the associated drive gear 17. As a result, a stronger clamping will permit the rotation of the carrying arm 14 to be changed as desired. The carrying arm 14 carries at its other end the stirring element 8. The drive may be so designed that the revolving motion of the stirring element 8 can automatically be adapted so that the revolving motion will be intensified to a degree which increases with the degree to which the stirring element 8 can be more easily rotated, and vice versa.

The revolution-imparting torque which is produced and tends to revolve the eccentric shaft 16 of the stirring element about the drive shaft 12 is substantially directly proportional to the resistance which opposes the rotation of the stirring element 8 in the surrounding material to be composted and is not always sufficient for a revolving movement about the drive shaft at a constant velocity. Particularly if waste materials which can easily be mixed, such as chopped parts cut from trees or bushes, predominate, the resistance to the rotation of the stirring element 8 will result in an inadequate revolving movement. That situation can be improved in accordance with the invention either in that an adjustable braking element is mounted on the carrying arm 14, which carries the shaft 16 of the stirring element, and said braking element acts directly on the drive shaft 12 to increase the torque which causes the carrying arm 14 to revolve, or in that a braking element acts directly on the shaft 16 of the stirring element. In either case a sudden increase of the lateral resistance exerted on the shaft 16 of the stirring element will not necessarily lock said shaft because the material cannot be mixed so quickly but the stirring element 8 is advanced at a lower velocity but acts under a constant pressure on that part of the waste material which can be mixed only less effectively and that action will be continued until said less effectively mixable parts have been mixed with the remaining material being composted. Thereafter the advance will again be accelerated. Such a sudden increase of said lateral resistance may be effected at any time by waste materials having a different structure (such as wet cut grass).

In another embodiment of the invention, the driving mechanism 9 comprises a spring-biased arm (FIG. 3), which is adapted to revolve about the drive shaft 12 and consists of the carrying arm 21 proper and a stirring element carrier 23, which is rotatably mounted on the carrying arm by a hinge 22. By a tension spring 24 disposed inside the carrying arm 21 the hinge 22 is biased to its extended position. The crank handle 25 which is mounted on the external shaft is non-positively connected to the drive wheel 26, which is non-positively connected to the drive 28 for the stirring element by means of a belt drive or chain drive 27. A brake band 29a of a band brake is trained around the drive shaft 12 and the braking force of the brake band 29a can be controlled by an adjusting member 29b to compensate wear and abrasion. In any case the brake band 29a will determine the revolving motion (R) of the spring-biased arm consisting of the carrying arm 21 and the stirring element carrier 23 about the drive shaft 12.

If the rotating stirring element 8 during its revolving motion strikes on accumulated compact material, which can be mixed only with difficulty, the stirring element carrier 23 will yield against the tensile force of the tension spring 24 in a sense which is opposite to that of the revolving motion (R) until the band brake is loosened so that the velocity of the revolving motion (R) of the rotating stirring element 8 will automatically be decreased. As the drive of the rotating stirring element 8 is continued, it works its way more slowly through the compacter material until the latter has been mixed. Thereafter the action of the tension spring 24 causes the stirring element carrier 23 to return to its original position and the band brake is increasingly tensioned again and the revolving motion (R) of the stirring element 8 is fully resumed. That arrangement has the advantage that the velocity of the revolving motion of the stirring element 8 is automatically adapted to the material to be mixed without a need for an intervention of the user and that the entire driving force will be available for the rotation of the stirring element at the instant at which the strongest force is required, i.e., when the stirring element 8 strikes on material which can be mixed only with difficulty, because the brake 29a, 29b will be loosened exactly at that time.

FIG. 4 shows another embodiment of a preferably cylindrical compost container 30 in accordance with the invention. The container 31 again comprises an upper chamber 32 for receiving the material to be composted and a lower chamber 34, which is separated from the upper chamber 32 by a sieve plate 33 and permits the compost to be taken. The upper chamber 32 is defined at its top by a top wall 35 of the container 31. That top wall is formed with a filling opening, not shown, and may constitute a part of a cover, which can be removed from the outer wall 36 of the container 31. A stirring mechanism 37 is disposed inside the upper chamber 32 and comprises a drive shaft 38, which extends along the center line of the chamber 32 and is rotatably mounted in a sleeve 39, which extends through the top wall 35 of the container. The drive shaft 38 is integral with an external shaft 38a, which at its outer end disposed above the top wall 35 of the container carries a crank handle 40. The stirring mechanism 37 comprises a stirring element 41, which is eccentric to the drive shaft 38 and consists of a conveyor screw or a helical conveying wire. The shaft 42 of the stirring element 41 is rotatably mounted in the outer ends of two radial carrying arms 43, 44, the inner ends of which are rotatably mounted on the drive shaft 38. The shaft 42 of the stirring element and the drive shaft 38 are interconnected by a drive 45, which is disposed above the upper carrying arm 43 and consists of a first chain sprocket 46, which is non-rotatably mounted on the drive shaft 38, a second chain sprocket 47, which is non-rotatably mounted on the shaft 42 of the stirring element, and a drive chain 48 connecting said chain sprockets.

A driving mechanism 49 consisting of a ratchet mechanism is disposed above the drive 45 for the stirring element 41 and serves to revolve the stirring element 41 together with the associated drive 45 and the two carrying arms 43, 44 about the center line of the upper chamber 32. That driving mechanism 49 comprises an eccentric 50, which is non-rotatably mounted on the shaft 42 of the stirring element and on which one end 51 of a pusher pawl 52 is rotatably mounted at a location which is eccentric to the axis of rotation of the eccentric 50. The other end 53 of the pusher pawl 52 extends into a ratchet wheel 54, which is mounted on the sleeve 39 at its lower end. One end 55 of a pulling pawl 57 is pivoted to the pusher pawl 52 at a distance from that end 51 of the pusher pawl 52 which is rotatably mounted on the eccentric 50. The other end 56 of the pulling pawl 57 extends into the ratchet wheel 54. A tension spring 58 is provided between the two pawls 52, 57 and tends to pull them toward each other.

The sleeve 39 extends through the top wall 35 of the container and at its lower end carries the ratchet wheel 54 of the driving mechanism 49. The sleeve 39 is rotatably mounted in the top wall 35 of the container and can be fixed thereto by clamping means 59, which are mounted on the sleeve 39 at its upper end, which protrudes out of the top wall 35. The clamping means comprise an eccentric disk 50, which is rotatably mounted on the sleeve 39 at its upper end and is rotatably mounted on the upper side of the top wall 35 of the container for rotation about an axis which is eccentric to the longitudinal axis of the sleeve. The eccentric disk 60 carries a laterally protruding lever 61 for loosening and tightening the eccentric disk 60. The clamping means 59 may be replaced by a ratchet mechanism, which comprises a ratchet wheel that is mounted on the sleeve 39 and a locking pawl, which is movably mounted on the top wall 35 of the container and can be moved by a hand lever out of and into engagement with the ratchet wheel.

For tumbling the contents of the container when the sleeve 39 is fixed to the top wall 35 of the container, the crank handle 40 is rotated so that the stirring element 41 is rotated about its own axis by means of the drive 45 and by means of the driving mechanism 49 the stirring element 41 and the carrying arms 43, 44 are constrained to revolve about the center line of the upper chamber 32. If a large amount of new material to be composted has been added so that a portion of the material to be mixed is so compact that it is difficult to turn the crank handle 40, the clamping means may be loosened to render the driving mechanism 49 ineffective. When the clamping means 59 have been loosened, the sleeve 39 as well as the ratchet wheel 54 at the lower end of the sleeve will be released so that the two pawls 52 and 57 no longer engage a ratchet wheel that is fixed to the container but engage a ratchet wheel 54 which is freely rotatably in the top wall 35 of the container. As a result, the revolving motion of the stirring element 41 is discontinued. When the turning of the crank handle 40 is then continued while the clamping means 59 are released the material being composted can be loosened up to such a degree that the crank handle 40 can again easily be turned. Thereafter the clamping means 59 are re-tightened so that the ratchet wheel 54 is again fixed to the top wall 35 of the container and the pawls 52 and 57 which engage the ratchet wheel 54 again impart to the stirring element 41 and the radial carrying arms 43, 44 a revolving motion about the center line of the upper chamber 32.

The fresh air which is required for aerating the material being composted is supplied through the lateral take-out opening, not shown, in the lower chamber 34 and through the holes of the sieve plate 33 to the material being composted. The air which has flown through the material being composted flows out of the upper chamber 32 through the filling opening which is provided in the top wall 35 of the container and thus leaves the compost container 30.

For a composting of waste material the volume of which is decreased by about 50 to 60% during the composting process the sieve plate 33 may be disposed on a level which is about 1/5 of the height of the compost container 30 so that the upper chamber 32 provides above the sieve plate 33 a sufficiently large usable volume for receiving the material to be composted, on the one hand, and the lower chamber 34 has a sufficiently large capacity for finished compost, on the other hand. In that case it will not be necessary to take the finished compost out in very short intervals of time.

In a preferred embodiment the sieve plate 33 consists of a perforated plate having bores which are about 10 to 15 mm in diameter and the sieve plate 33 is detachably mounted on brackets, which are mounted on the inside surface of the compost container 30 and when a smaller particle size is desired can simply be replaced by a perforated plate having smaller bores.

To facilitate the replacement of the sieves, the sieve plate may comprise two superimposed sieves, which can be replaced through a lateral slot in the outer wall 36 of the compost container 30.

The carrying arm 44 of the stirring mechanism 37 is disposed closely above the sieve plate 33 and may carry a scraping knife or a brush or another means for cleaning the sieve plate 33. Such cleaning means are arranged to revolve in unison with the carrying arm 44 about the center line of the upper chamber 32.

Instead of having a cylindrical cross-section, the compost container in accordance with the invention may have a polygonal cross-section with preferably rounded corners. Instead of consisting of a part of an integral container, the two chambers of the compost container may be formed in two containers, which are stacked one on the other. It is also possible to provide a compost container which contains only the upper chamber with the stirring mechanism and which discharges the finished compost downwardly and stands, e.g., on four feet or is mounted on a wall bracket above a compost-collecting pit.

In the compost container in accordance with the invention the crank handle mounted on the external shaft may be replaced by an electric motor, which is powered by a solar battery and serves to drive the stirring mechanism.

I claim:

1. A compost container comprising a top wall and defining an interior chamber for receiving material to be composted, the interior chamber having a vertical center axis, and the container having an upper opening for filling the interior chamber with the material to be composted and a lower opening for discharging the composted material from the interior chamber, and the compost container further comprising a stirring mechanism for stirring the material in the interior chamber, the stirring mechanism comprising
   (a) a drive shaft extending along the vertical center axis and projecting outwardly above the top wall,
   (b) a carrier for a stirring element, the carrier being revolvable about the center axis and carrying
      (1) a stirring element having an axis extending in the interior chamber eccentrically with respect to the center axis and being rotatable about the axis, and
   (c) a driving mechanism drivable by the drive shaft, the driving mechanism comprising
      (1) a first driving part coupled to the driving mechanism for imparting rotation to the stirring element about the axis, and
      (2) a second driving part arranged to be uncoupled from the driving mechanism for revolving the stirring element carrier and the stirring element carried thereby about the center axis.

2. The compost container of claim 1, wherein the driving mechanism comprises a connection frictionally coupling the first and second driving parts for a limited transmission of torque from the first to the second driving part, the frictional connection causing the revolving velocity of the carrier and the stirring element carried thereby to be increased when the stirring element encounters relatively little resistance in the material to be composted while the revolving velocity is decreased when the resistance is high.

3. The compost container of claim 2, wherein the second driving part is a carrying arm constituting said carrier and being revolvable about the drive shaft, the carrying arm having an outer end carrying the stirring element, and the frictional coupling connection is a clamping means frictionally coupling the carrying arm and the first driving part.

4. The compost container of claim 3, wherein the clamping means is a friction brake.

5. The compost container of claim 3, wherein the clamping means is adjustable.

6. The compost container of claim 3, wherein the clamping means is an adjustable friction brake.

7. The compost container of claim 2, wherein the second driving part is a carrying arm constituting said carrier and being revolvable about the drive shaft, the carrying arm having an inner section and an outer section having an outer end carrying the stirring element, a hinge pivotally connecting the inner and outer carrying arm sections and a tension spring biasing the outer section into a pre-tensioned, extended position, and the frictional coupling connection comprises a brake band adjustable by a movement of the carrying arm sections relative to each other, the tension spring being biased in a direction opposite the relative movement to tension the brake band.

8. The compost container of claim 1, wherein the second driving part is mechanically coupled to the first driving part.

9. The compost container of claim 8, wherein the second driving part is a carrying arm constituting said carrier and being revolvable about the drive shaft, the carrying arm having an outer end carrying the stirring element, and further comprising an eccentric member on the stirring element, and a pawl-and-ratchet mechanism drivingly connected to the carrying arm and detachably connected to the container, the pawl-and-ratchet mechanism comprising a ratchet wheel connectable to the container and at least one driving pawl linked to the eccentric member eccentrically with respect to the stirring element axis and engageable with, and disengageable from, the ratchet wheel by the rotating stirring element, the second driving part being uncoupled from the driving mechanism upon disconnecting the ratchet wheel from the container.

10. The compost container of claim 9, wherein the pawl-and-ratchet mechanism comprises two of said driving pawls, the pawls being pivotally linked to each other, a spring biasing the pawls against the ratchet wheel, one of the driving pawls eccentrically linked to the eccentric member being a pushing pawl and the other driving pawl being a pulling pawl pivotally mounted on the one driving pawl.

11. The compost container of claim 9, further comprising a sleeve rotatably journaled in, and outwardly projecting from, the top wall, the sleeve carrying the pawl-and ratchet mechanism, and a clamping means accessible from outside the container above the top wall for affixing the sleeve to the top wall, the second driving part being uncoupled from the driving mechanism upon disconnecting the clamping means.

12. The compost container of claim 1, wherein the first driving part comprises a first driving gear non-rotatably mounted on the drive shaft, an intermediate gear meshing with the first driving gear and rotatably mounted on the stirring element carrier, and a second driving gear meshing with the intermediate gear and non-rotatably mounted on the stirring element.

13. The compost container of claim 1, wherein the first driving part comprises a chain drive connecting the stirring element to the drive shaft.

14. The compost container of claim 1, wherein the stirring element is a screw.

15. The compost container of claim 1, wherein the stirring element is a helix.

16. The compost container of claim 1, further comprising a sieve mounted below the stirring mechanism and above the lower opening to delimit the interior chamber to be filled with the material to be composted.

17. The compost container of claim 16 wherein the sieve is exchangeably mounted in the container.

18. A compost container comprising a removable cover closing an interior chamber in the container for receiving material to be composted, the interior chamber having a vertical center axis, the cover having an upper opening for filling the interior chamber with the material to be composted and the container having a lower opening for discharging the composted material from the interior chamber, and a stirring mechanism mounted on the cover for stirring the material in the interior chamber, the stirring mechanism comprising
  (a) a drive shaft extending along the vertical center axis and projecting outwardly above the top wall,
  (b) a carrier for a stirring element, the carrier being revolvable about the center axis and carrying
    (1) a stirring element having an axis extending in the interior chamber eccentrically with respect to the center axis and being rotatable about the axis, and
  (c) a driving mechanism drivable by the drive shaft, the driving mechanism comprising
    (1) a first driving part coupled to the driving mechanism for imparting rotation to the stirring element about the axis, and
    (2) a second driving part arranged to be uncoupled from the driving mechanism for revolving the stirring element carrier and the stirring element carried thereby about the center axis.

19. The compost container of claim 18 wherein the driving mechanism comprises a connection frictionally coupling the first and second driving parts for a limited transmission of torque from the first to the second driving part, the frictional connection causing the revolving velocity of the carrier and the stirring element carried thereby to be increased when the stirring element encounters relatively little resistance in the material to be composted while the revolving velocity is decreased when the resistance is high.

20. The compost container of claim 19, wherein the second driving part is a carrying arm constituting said carrier and being revolvable about the drive shaft, the carrying arm having an outer end carrying the stirring element, and the frictional coupling connection is a clamping means frictionally coupling the carrying arm and the first driving part.

21. The compost container of claim 20, wherein the clamping means is a friction brake.

22. The compost container of claim 20, wherein the clamping means is adjustable.

23. The compost container of claim 22, wherein the clamping means is an adjustable friction brake.

24. The compost container of claim 19, wherein the second driving part is a carrying arm constituting said carrier and being revolvable about the drive shaft, the carrying arm having an inner section and an outer section having an outer end carrying the stirring element, a hinge pivotally connecting the inner and outer carrying arm sections and a tension spring biasing the outer section into a pre-tensioned, extended position, and the frictional coupling connection comprises a brake band adjustable by a movement of the carrying arm sections relative to each other, the tension spring being biased in a direction opposite the relative movement to tension the brake band.

25. The compost container of claim 18, wherein the second driving part is mechanically coupled to the first driving part.

26. The compost container of claim 25, wherein the second driving part is a carrying arm constituting said carrier and being revolvable about the drive shaft, the carrying arm having an outer end carrying the stirring element, and further comprising an eccentric member on the stirring element, and a pawl-and-ratchet mechanism drivingly connected to the carrying arm and detachably connected to the container, the pawl-and-ratchet mechanism comprising a ratchet wheel connectable to the container and at least one driving pawl linked to the eccentric member eccentrically with respect to the stirring element axis and engageable with, and disengageable from, the ratchet wheel by the rotating stirring element, the second driving part being uncoupled from the driving mechanism upon disconnecting the ratchet wheel from the container.

27. The compost container of claim 26, wherein the pawl-and-ratchet mechanism comprises two of said driving pawls, the pawls being pivotally linked to each other, a spring biasing the pawls against the ratchet wheel, one of the driving pawls eccentrically linked to the eccentric member being a pushing pawl and the other driving pawl being a pulling pawl pivotally mounted on the one driving pawl.

28. The compost container of claim 26, further comprising a sleeve rotatably journaled in, and outwardly projecting from, the cover, a sleeve carrying the pawl-and ratchet mechanism, and a clamping means accessible from outside the container above the cover for affixing the sleeve to the cover, the second driving part being uncoupled from the driving mechanism upon disconnecting the clamping means.

29. The compost container of claim 18, wherein the first driving part comprises a first driving gear non-rotatably mounted on the drive shaft, an intermediate gear meshing with the first driving gear and rotatably mounted on the stirring element carrier, and a second driving gear meshing with the intermediate gear and non-rotatably mounted on the stirring element.

30. The compost container of claim 18, wherein the first driving part comprises a chain drive connecting the stirring element to the drive shaft.

31. The compost container of claim 18, wherein the stirring element is a screw.

32. The compost container of claim 18, wherein the stirring element is a helix.

33. The compost container of claim 18, further comprising a sieve mounted below the stirring mechanism and above the lower opening to delimit the interior chamber to be filled with the material to be composted.

34. The compost container of claim 33, wherein the sieve is exchangeably mounted in the container.

* * * * *